US008686348B2

(12) United States Patent
Chirovsky et al.

(10) Patent No.: US 8,686,348 B2
(45) Date of Patent: Apr. 1, 2014

(54) HIGH VOLTAGE INSULATING SLEEVE FOR NUCLEAR WELL LOGGING

(75) Inventors: Leo Chirovsky, East Windsor, NJ (US); Anthony Durkowski, Round Rock, TX (US); Kevin Hiles, Princeton Junction, NJ (US); Jani Reijonen, Princeton, NJ (US); Matthieu Simon, Houston, TX (US); Peter Wraight, Skillman, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 209 days.

(21) Appl. No.: 13/366,970

(22) Filed: Feb. 6, 2012

(65) Prior Publication Data

US 2012/0199730 A1 Aug. 9, 2012

Related U.S. Application Data

(60) Provisional application No. 61/440,626, filed on Feb. 8, 2011.

(51) Int. Cl.
*G01V 5/00* (2006.01)

(52) U.S. Cl.
USPC .......................................................... 250/256

(58) Field of Classification Search
USPC .................... 250/256, 257–268, 269.1–269.8
See application file for complete search history.

(56) References Cited

U.S. PATENT DOCUMENTS

| | | | | |
|---|---|---|---|---|
| 5,067,090 | A | 11/1991 | Seeman | |
| 5,608,215 | A | 3/1997 | Evans | |
| 5,884,234 | A | 3/1999 | Jorion et al. | |
| 7,073,378 | B2 | 7/2006 | Smits et al. | |
| 7,633,058 | B2 | 12/2009 | Stoller et al. | |
| 7,692,140 | B1 | 4/2010 | Hall et al. | |
| 2002/0014583 | A1 | 2/2002 | Bothner | |
| 2006/0145145 | A1* | 7/2006 | Nishio | 257/40 |
| 2009/0135982 | A1* | 5/2009 | Groves | 376/113 |

* cited by examiner

*Primary Examiner* — Kiho Kim
(74) *Attorney, Agent, or Firm* — Jeremy Berman

(57) ABSTRACT

A well logging instrument includes an instrument housing to traverse a wellbore penetrating subsurface formations. An electrically operated energy source that emits ionizing radiation is disposed inside the housing. An insulating sleeve is disposed between the energy source and an interior wall of the housing. The insulating sleeve comprises a thin dielectric film arranged in a plurality of tightly fitting layers of dielectric material disposed adjacent to each other and successively. A thickness of each layer and a number of layers is selected to provide a dielectric strength sufficient to electrically insulate the energy source from the housing and to provide a selected resistance to dielectric failure resulting from the ionizing radiation.

19 Claims, 5 Drawing Sheets

Schematic of Eventual Insulation Sleeve Charging
Due to $SF_6$ Ionization Events With No Space Charge Diffusion

HIGH VOLTAGE INSULATING SLEEVE FOR NUCLEAR WELL LOGGING

CROSS-REFERENCE TO RELATED APPLICATIONS

Priority is claimed from U.S. Provisional Application No. 61/440,626 filed on Feb. 8, 2011.

STATEMENT REGARDING FEDERALLY SPONSORED RESEARCH OR DEVELOPMENT

Not applicable.

BACKGROUND

The invention relates generally to the field of well logging instrumentation using high voltage operated energy sources. More specifically, the invention relates to electrical insulators used with such well logging instrumentation when the insulation is exposed to ionizing radiation.

Certain well-logging instruments, for example, pulsed neutron devices and x-ray emitting devices, require the use of very high voltages within relatively small and confined spaces, at high temperatures and in the presence of ionizing radiation. In such well logging instruments, the components operated at high voltage are located near ground potential components, such as the instrument housing. The high voltage operated components and the ground potential components are electrically isolated from each other using insulation that can occupy a tightly confined space. Evaluation of such insulation, even insulation having higher than the required dielectric strength when initially placed into service may fail over time (often catastrophically in just a few hundred hours' operating time). This has been shown especially to be the case if the well logging instrument, while operating at a high ambient temperature, produces ionizing radiation or may operate in the presence of externally produced ionizing radiation.

Experiments performed repeatably several times have shown that under certain conditions, insulating sleeves known in the art used with pulsed neutron generators ("PNGs") can fail catastrophically within a few hundred (~400-600) hours of PNG operating time. The tested insulating sleeves were double layer sleeves with the required initial dielectric strength and sleeve thickness. The first visible indicia of insulating sleeve failure were sudden current spikes (arcs) inside a chamber that houses the PNG and its high voltage ("HV") power supply, such arcs occurring many hours apart. Once the arcs became more frequent, PNG operation was stopped and the chamber was opened. At certain points adjacent to the HV end of the inner insulating sleeve, the tested insulating sleeves had degraded enough to show a multiplicity of burned tracks. One example of such degraded sleeves is shown in FIG. 1A. FIG. 1A is a photograph of the outer layer of the insulating sleeve, the outer surface of which faced the wall of the grounded instrument housing. The burn tracks are highly concentrated at the outer surface, forming "tree trunk" like structures that then begin to branch out slowly toward the inner surface of the insulating sleeve. FIG. 1B is a photograph of the inner layer of the insulating sleeve, the inner surface of which faced the HV end of the PNG. The burn tracks are somewhat concentrated at the outer surface, forming "thick branch" like structures there and then branch out towards the inner surface into a widely diverging maze of small branches.

It is useful for HV well logging instrument designers to understand how and why insulating sleeve damage occurs. It is desirable to increase the useful lifetime of an insulating sleeve by means other than making the insulating sleeve thicker and/or using a higher intrinsic dielectric strength material, since both of the foregoing parameters already are near their practical maxima to meet the operating requirements of well logging instruments known in the art.

SUMMARY

A well logging instrument according to one aspect of the invention includes an instrument housing that can traverse a wellbore penetrating subsurface formations. An electrically operated energy source that emits ionizing radiation is disposed inside the housing. An insulating sleeve is disposed between the energy source and an interior wall of the housing. The insulating sleeve comprises a plurality of layers of dielectric material disposed adjacent to each other and radially successively. A thickness of each layer and a number of layers is selected to provide a dielectric strength sufficient to electrically insulate the energy source from the housing and to provide a selected resistance to dielectric failure resulting from the ionizing radiation.

A method for making a well logging instrument according to another aspect includes making an insulating sleeve by applying successive layers of a dielectric material to one another in the thickness direction. A thickness of each layer and a number of layers are selected to provide a dielectric strength sufficient to electrically insulate an electrically operated energy source from an instrument housing and to provide a selected resistance to dielectric failure resulting from ionizing radiation. The insulating sleeve is disposed between the energy source and an interior wall of an instrument housing therewithin.

Other aspects of the invention will be apparent from the following description and the appended claims.

DETAILED DESCRIPTION

The explanation below is believed to represent the mechanism by which an electrical insulating sleeve used in high voltage ("HV") operated well logging instruments can degrade and fail as a result of exposure to high temperatures, high voltage and ionizing radiation. Following the explanation of the believed failure mechanism is a proposed insulating sleeve structure that may be more resistant to such failure, while using the same materials and dimensions as insulating sleeves known in the art prior to the present invention. An example electrically operated energy source such as a pulsed neutron generator ("PNG") used in certain types of well logging instruments produces ionizing radiation in the form of neutrons and X-rays. The neutrons and X-rays can cause ionization events in the electrical insulating sleeve and in an insulating gas such as sulfur hexafluoride ($SF_6$) that may be disposed in the space between the PNG and the insulating sleeve and instrument housing. In the solid material of the insulating sleeve, the freed electric charges have nowhere to go and so they recombine. However, in the insulating gas disposed outside the sleeve, a high amplitude electric field can cause positive ions to flow toward the outer surface of the insulating sleeve while electrons flow toward the housing wall. In the insulating gas inside the insulating sleeve, a high electric field can cause freed electrons to flow toward the inner surface of the insulating sleeve and positive ions can flow toward the PNG. Therefore, the freed charges formed in the insulating gas ($SF_6$) cannot recombine, but instead coat the walls of the insulating sleeve, making very intimate contact in the form of ions on the outer surface and electrons on the inner surface of the insulating sleeve. Also as a result of the foregoing electrical charging of the insulating sleeve walls, the entire applied HV voltage drop is then disposed in the sleeve, whereas a portion of the voltage drop was initially disposed in the insulating gas. Thus, the electric field amplitude increases within the insulating sleeve due to the charging of the insulating sleeve walls.

Figure 1A:
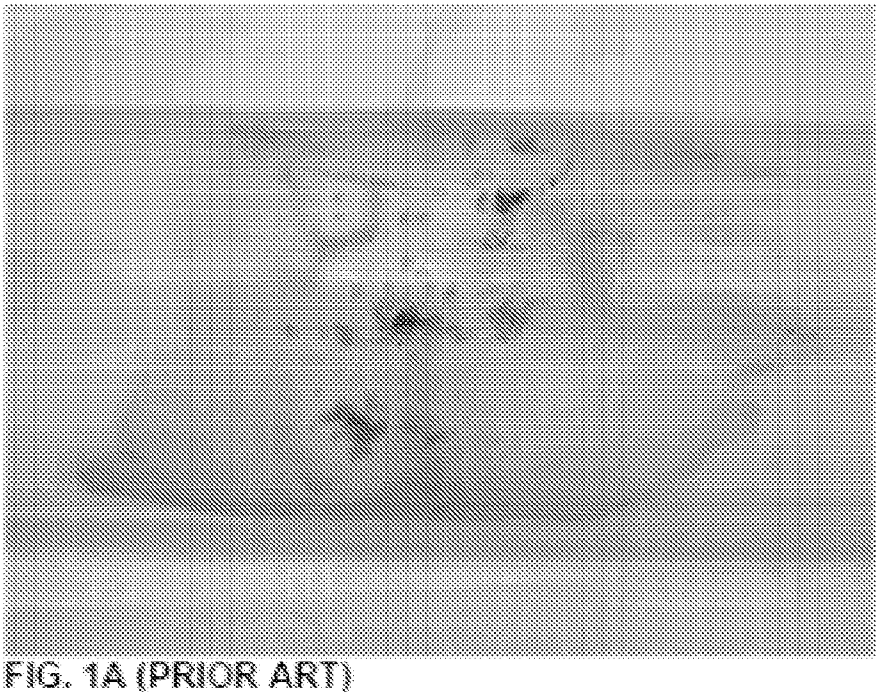
FIG. 1A (PRIOR ART)
FIG. 1A and FIG. 1B show examples of prior insulating sleeves having failed as a result of exposure to ionizing radiation.
Figure 1B:
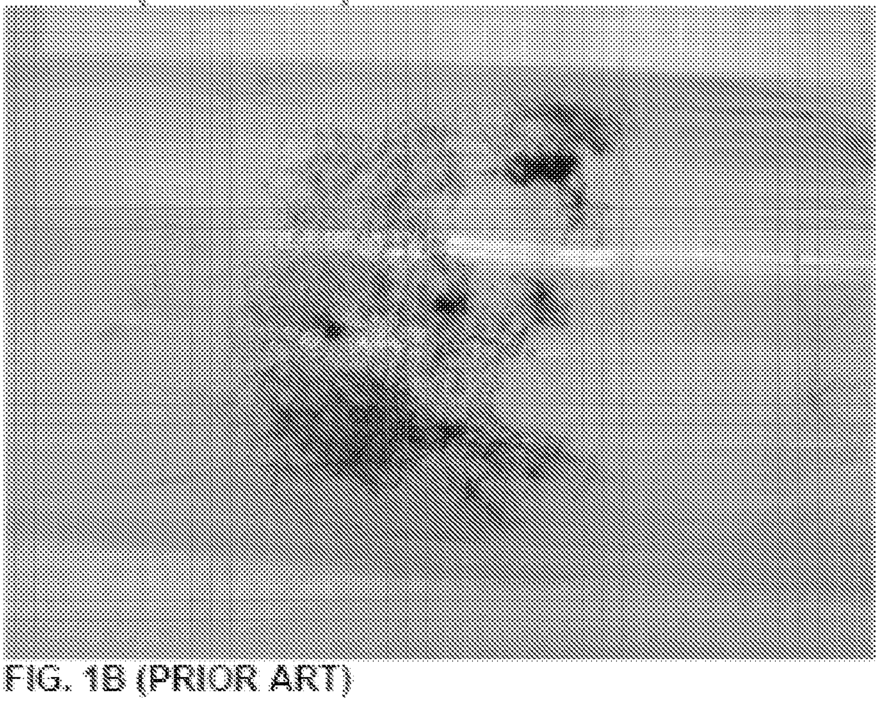
FIG. 1B (PRIOR ART)
Figure 3:
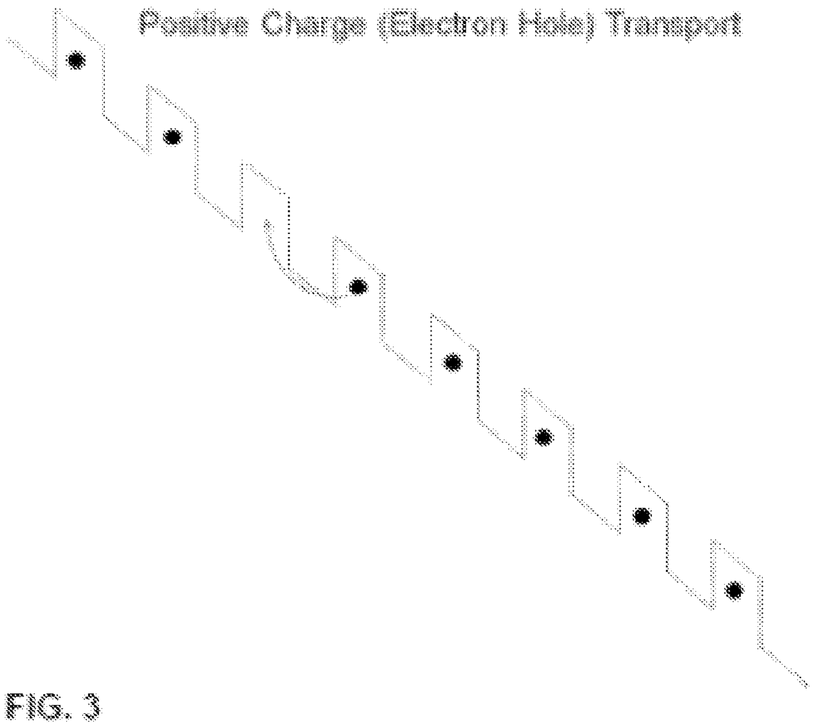
FIG. 3 shows a schematic illustration of how positive space charge, in the form of electron holes, can diffuse (propagate slowly) through a material in the presence of a high electric field.

The foregoing two effects may then combine to increase charge injection into the insulating sleeve. Unbound electrons may begin to enter the insulating sleeve material directly at the inside wall. Positive charges may inject indirectly at the outside wall when the positive ions, in intimate contact, may draw bound electrons out of the surface wall forming "electron holes" which are then unbound. The neutralized insulating gas molecules may then migrate away from the insulating sleeve wall back into the main body of the insulating gas, leaving their charges deposited in the insulating sleeve wall. The injected charges thus may form space charge fronts in the insulating sleeve material, consisting of unbound holes on the outer surface and unbound electrons on the inner surface. Because the insulating sleeve material initially has a very low electrical conductivity, the unbound space charge fronts may move very slowly toward each other under the influence of the increased electric field in the insulating sleeve. FIG. 3 illustrates how the holes can move. The motion of the holes in turn leads to an increase in the electric field amplitude, which then accelerates the foregoing process. In time, the hole and free electron fronts may come close enough to each other to begin causing electron cascades (i.e., arcs) through the insulating sleeve material, damaging the material and creating increasingly conductive paths, which in turn allow more frequent arcing, eventually leading to total insulation failure, as was shown in and explained with reference to FIGS. 1A and 1B.

The damage patterns described above with reference to FIGS. 1A and 1B suggest that at least at the onset the electron hole space charge front advances more in columns than in rows, perhaps following defect paths, while the electron front advances more in rows. The columns advance faster and then slowly spread out due to charge repulsion. As the foregoing two fronts come closer, the electron space charge may then also begin to form into columns that are drawn together by electrical attraction to the denser hole columns, which may then begin to spread out faster. When the opposing columns meet or come close to each other, they may form paths for cascading electrons which may then burn the paths into the insulating sleeve material.

The above time-dependent insulating sleeve degradation process may at least be inhibited and slowed down in three ways. One way is to impede the charge injection into the insulating sleeve material at the inner and outer surfaces. Another way is to slow down the space charge diffusion. Finally it is possible to hinder electron cascades. Increasing the total thickness of the insulating sleeve can accomplish the latter two degradation slowing mechanisms to some degree (mostly by decreasing the electric field in the sleeve material), but volume constraints, as mentioned in the Background section herein may limit the use of such an approach. Increasing the dielectric strength of the insulating sleeve material can also accomplish the latter two mechanisms to some degree, but the materials having the highest usable dielectric strength in the well logging environment are already well known by those familiar with the state of the art.

Those familiar with the state of the art will also appreciate that thin layers of a given material disposed proximate or in contact with each other can have somewhat higher dielectric strength than thick layers of equal total thickness of the same material. Thus, a plurality of thin layers with the same total thickness as a single (or several) relatively thick layer of the same material may withstand a somewhat higher electric field in the short term. However, it has also been determined through experimentation that a plurality of thin layers of the same material in thickness-dimension contact with each other having total thickness as a single thick layer of the same materials can dramatically slow down charge diffusion and inhibit electron cascades. An insulating sleeve made using the foregoing discovery may provide increased resistance to degradation and abrupt failure.

If ionizing radiation is either the desired product or an unavoidable byproduct of a specific HV operated well logging tool, then its ability to cause charge injection (described above) should be mitigated. Even if it is just an unavoidable byproduct, often space constraints do not allow for radiation shielding. Thus, the ionization of the insulating gas (such as $SF_6$) may generally be tolerated, and the ability of the resulting charging of the insulating sleeve walls with gas ions and electrons should be avoided. The avoidance of charging of the insulating sleeve wall with positively charged gas ions may be the more useful task, because these ions can polarize, exposing their negative ends into the gas, thereby actually attracting more positively charged gas ions. The net result is a "clumping" of positive ions with the positive ends of the innermost ones in very intimate contact with the sleeve molecules whereby the ions can scavenge electrons from the sleeve material, that is, inject electron holes into the sleeve material. The holes may also form clumps, which may then advance deeper (diffuse) into the sleeve material in the columns mentioned above. The ionic charging of the insulating sleeve may be reduced by coating the appropriate sleeve surface with a thin layer of a partially electrically conducting material.

Figure 2:
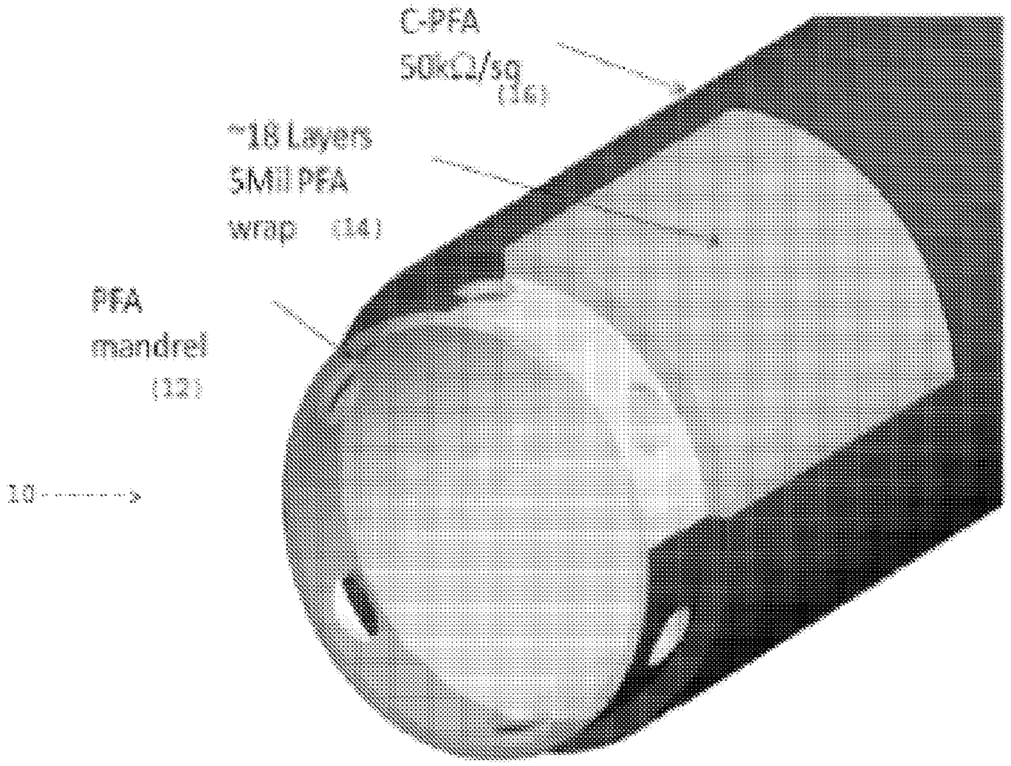
FIG. 2 shows an example structure of an insulating sleeve according to the present disclosure.

FIG. 2 shows an example of an insulating sleeve 10 that may be expected to maintain its dielectric strength for much longer periods of time at high ambient temperatures and in the presence of ionizing radiation, while occupying the same confined space (or volume) as insulating sleeves known in the art. An effective and inexpensive way to construct such an insulating sleeve using a relatively large number of thin layers in thickness dimension contact with each other is to begin with a mandrel 12 that includes a sleeve between about one quarter to one third the total intended thickness of the completed insulating sleeve. The mandrel may be made from a polymer such as a perfluoroalkoxy copolymer resin sold under the trademark TEFLON PFA, which is registered trademark of E.I. DuPont de Nemours & Co., Wilmington, Del.

The mandrel 12 may serve to maintain a well defined inner diameter and the mandrel 12 may be wrapped with a thin film of the TEFLON PFA resin (in the present example about 5 mils or 0.005 inches thickness) to form a plurality of tightly fitting, or adjacent, successive, layers 14 as required to provide a desired total insulating sleeve thickness. The number of layers, the thickness of each layer and thus the total thickness of the layers may be selected to provide sufficient dielectric strength to prevent discharge of the voltage used to operate a HV energy source in a well logging instrument (see below with reference to FIG. 2A) to a ground potential instrument housing.

The wrapped layers 14 can then be tightly encased with 50 kΩ/square, heat-shrinkable tubing 16 such as C-PGA (C impregnated PFA) polymer. The terms adjacent, successive and tightly fitting as used herein is intended to mean that adjacent layers are in physical contact with each other, or may be separated by a gap of at most about 0.002 inches (2 mils). In other examples, the thickness of the individual layers may be at most about 0.020 inches (20 mils). The foregoing technique of winding the layers 14 around the mandrel 12 is a convenient technique for assembling successive, adjacent layers of thin, flexible material. It is also within the scope of the present invention to assemble the insulating sleeve by applying concentric, cylindrical layers 14 successively onto or into each other.

Figure 4:
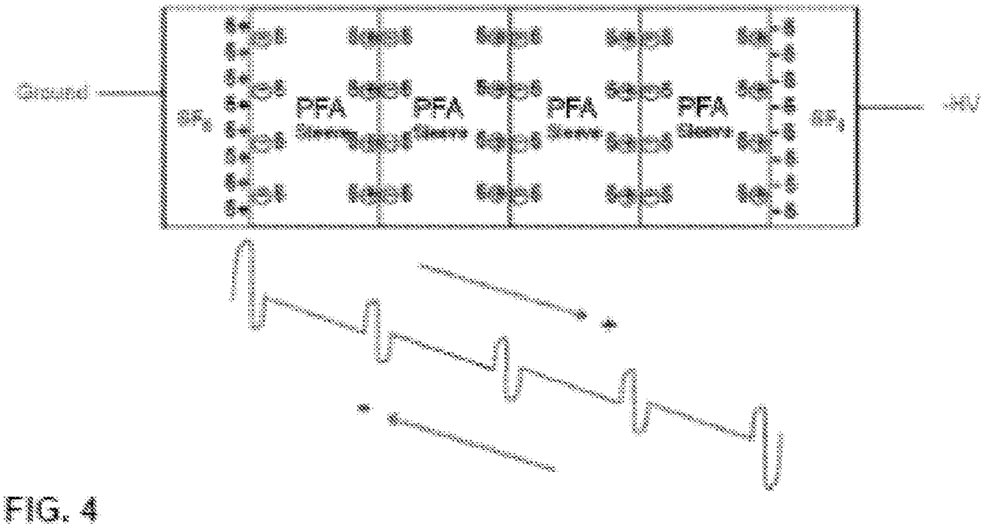
FIG. 4 shows a schematic illustration of the charging of a multilayer insulator due to ionization events in the surrounding sulfur hexafluoride ($SF_6$,) insulating gas, and of the multitude of macroscopic wells and barriers that are then formed to inhibit or at least to impede space charge diffusion.

An explanation as to why the foregoing structure for an insulating sleeve is expected to operate as believed is illustrated in FIG. 4. For simplicity, four layers are shown, however the above described principle implies that increasing the number of layers may be expected to make the insulating sleeve correspondingly longer lasting. That principle is that in the presence of an electric field, as dielectric materials polarize, layers of bound charges develop at the surfaces normal to the field, negatively charged on one side and positively charged on the other. As long as the electric field does not exceed the dielectric strength of the material, the bound charges will not move but will stay in place. Thus, at the interfaces between tightly fitting, discrete layers, the bound charge layers form sets of wells (traps) and barriers to any flow of free charges. These wells (traps) and barriers may not be impenetrable, but they provide a delaying action, which translates to longer lasting insulation. An insulating sleeve made of a plurality of layers of insulating material that in the aggregate have a thickness of a single layer of the same material therefore develops a large multiplicity of wells (traps) and barriers, which as a result repeatedly inhibit the diffusion of space charges and even electron cascades. In order to obtain a plurality of layers without increasing the total thickness, the layers may be made thinner as the number of layers is increased. Thus a plurality of thin layers of insulating material disposed one radially outside the other should be used for a longer lasting insulating sleeve.

The use of thin layers of insulating material may provide an additional benefit beyond the fact that the thin layers provide somewhat higher dielectric strength than a single layer of the same aggregate thickness and that they hinder charge diffusion. In a single thick layer, a cascading electron, by traveling a longer distance along an electric field line can gather enough energy to pass over wells (traps) and through barriers. In a thin enough layer, an electron that begins to cascade will encounter a well and barrier set before it has enough energy to penetrate and will stop.

The above hypothesis on how insulation sleeves deteriorate with time in a PNG was tested in several ways. Several results were obtained suggesting confirmation of the hypothesis. Two, single-layer insulating sleeves with the same total thickness as double layer insulating sleeves were tested under the same conditions (temperature, HV and ionizing radiation rate) and failed within 100 to 300 hours, whereas the double-layer sleeves had lasted 400 to 600 hours. A number of triple layer insulating sleeves tested under similar conditions have lasted over 700 hours. Finally, another single-layer insulating sleeve was tested in the same chamber as the above single and double layer sleeves, with the same HV applied at the same temperature, but without the production of any ionizing radiation. That sleeve lasted over 700 hours with no sign of degradation. The test was terminated having demonstrated that the hypothesis may be proper. Without charge injection, there may not be much charge diffusion that leads to electron cascades and damage.

Figure 2A:
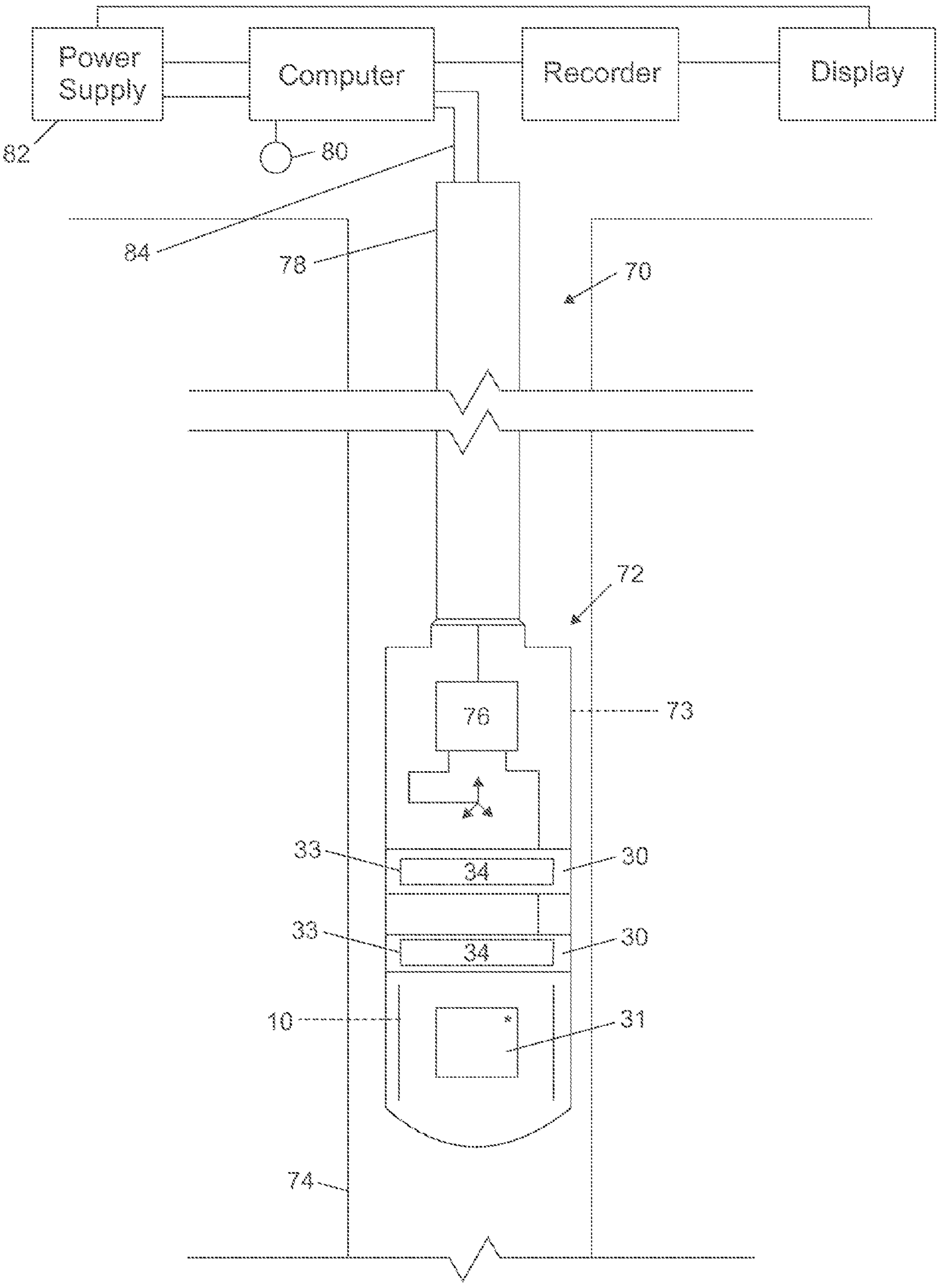
FIG. 2A shows an example well logging instrument that may use a shield as explained with reference to FIG. 2.

FIG. 2A shows an example well logging system 70 used to acquire subsurface measurement data that may including an insulating sleeve according to the invention. The well logging system 70 includes a downhole tool 72 shown disposed in a borehole 74 traversing subsurface formations. The downhole tool 72 may be, for example, of the type described in U.S. Pat. Nos. 7,073,378, 5,884,234, 5,067,090 and 5,608,215 (all of which are assigned to the assignee of the present invention). The downhole tool 72 may include an electrically operated energy source 31 (e.g., a pulsed neutron generator or X-ray generator) that directly or as a byproduct of its operation generates ionizing radiation. The energy source 31, if in the form of a pulsed neutron generator, may use a high voltage power supply (not shown separately) having voltage output selected to cause operation of the energy source 31 as explained in the Background section herein. In such case, the energy source 31 may be surrounded by an electrically insulating sleeve 10 made as explained with reference to FIG. 2. In some applications, the energy source 31 may be, for example, an X-ray generator. The thickness of the insulating sleeve 10 includes a selected number of layers (14 in FIG. 1) of dielectric material disposed adjacent to each other and successively in between the energy source 31 with its associated power supply (not shown separately), and the interior wall of a tool housing 73. The tool housing 73 may be made from non-magnetic, high strength material such as titanium, stainless steel or monel, which are electrically conductive. The number of layers 14 is selected so that a total thickness of the insulating sleeve 10 is selected to have a dielectric strength sufficient to electrically insulate the energy source 31 from the housing 73. Space in the lower part of the tool housing 73, where the energy source 31 is disposed may be charged with high dielectric strength, insulating gas, such as sulfur hexafluoride ($SF_6$) as previously explained herein Shields 30 may be disposed on the downhole tool 72 body, surrounding radiation detectors 34 (e.g., gamma ray detectors) mounted within housing structures 33 that may be disposed inside the tool housing 73. The shields 30 may be disposed on the tool 72 by wrapping layered shielding pre-preg material under tension, by sliding a shield onto the tool body as a pre-formed sleeve structure, by applying circumferential segments, or by other means known in the art. The shields 30 may be held in place using any suitable means known in the art. In some examples the tool housing 73 may include a recessed area or voids to accept the shield(s) 30 (not shown). Having such recesses would allow for a streamlined or smaller diameter configuration for the tool 72. In addition to the energy source 31 and detectors 34, the tool 72 may be equipped with additional energy sources and sensors (not shown) to perform a variety of subsurface measurements as known in the art. The downhole tool 72 may include electronics/hardware 76 with appropriate circuitry for making and communicating or storing measurements made by the various sensors (e.g., detectors 34) in the tool 72.

The tool 72 is shown suspended in the borehole 74 by a conveyance device 78, which can be a wireline system (e.g., slickline, armored electrical cable, and/or coiled tubing having electrical cable therein, etc.) or a pipe string in the case of a logging while-drilling system. With a wireline conveyance device, the tool 72 is raised and lowered in the borehole 74 by a winch 80, which is controlled by the surface equipment 82. The conveyance 78 includes insulated electrical conductors 84 that connect the downhole electronics 76 with the surface equipment 82 for signal/data/power and control communication. In some applications, with drill string or slickline, the power may be supplied downhole, the signals/data may be processed and/or recorded in the tool 72 and the recorded and/or processed data transmitted by various telemetry means to the surface equipment 82. The precise forms and details of the signals produced and/or detected with the sources and detectors vary according to the desired measurements and applications as known in the art and are not limitations on the scope of the present invention.

A well logging instrument using an electrically operated energy source having an insulating sleeve made according to the various aspects of the invention may have longer insulating sleeve lifetime in the presence of heat and ionizing radiation than similar instruments made using insulating sleeves known in the art prior to the present invention.

While the invention has been described with respect to a limited number of embodiments, those skilled in the art, having benefit of this disclosure, will appreciate that other embodiments can be devised which do not depart from the scope of the invention as disclosed herein. For example, the insulating sleeve may be used in applications outside of boreholes. Accordingly, the scope of the invention should be limited only by the attached claims.

What is claimed is:

1. A well logging instrument, comprising:

an instrument housing to traverse a wellbore penetrating subsurface formations;

an electrically operated energy source that emits ionizing radiation disposed inside the housing;

an insulating sleeve disposed between the energy source and an interior wall of the housing, the insulating sleeve comprising a plurality of layers of dielectric material disposed onto each other successively, a thickness of each layer and a number of layers selected to provide a dielectric strength sufficient to electrically insulate the energy source from the housing and to provide a selected resistance to dielectric failure resulting from the ionizing radiation.

2. The well logging instrument of claim 1 wherein the insulating sleeve further comprises a mandrel disposed in an interior of the plurality of layers, the mandrel made from a dielectric material.

3. The well logging instrument of claim 2 wherein the mandrel is made from the same dielectric material as the layers.

4. The well logging instrument of claim 1 wherein the insulating sleeve comprises a heat shrinkable, electrically insulating tubing on an exterior of the plurality of layers.

5. The well logging instrument of claim 1 further comprising an electrically insulating gas disposed inside the housing proximate the energy source and the insulating sleeve.

6. The well logging instrument of claim 5 wherein the electrically insulating gas comprises sulfur hexafluoride.

7. The well logging instrument of claim 1 wherein the energy source comprises at least one of a pulsed neutron generator and an X-ray generator.

8. The well logging instrument of claim 1 wherein the layers are formed by winding the dielectric material.

9. The well logging instrument of claim 1 wherein the layers are formed by inserting concentric cylindrical components of the dielectric material onto or into each other.

10. The well logging instrument of claim 1 wherein a spacing between successive layers is at most 0.002 inches.

11. The well logging instrument of claim 1 wherein the thickness of each layer is at most 0.020 inches.

12. The well logging instrument of claim 11 wherein the thickness of each layer is about 0.005 inches.

13. A method for making an instrument comprising:

making an insulating sleeve by applying successive layers of a dielectric material to one another in the thickness direction, a thickness of each layer and a number of layers selected to provide a dielectric strength sufficient to electrically insulate an electrically operated energy source from an instrument housing and to provide a selected resistance to dielectric failure resulting from ionizing radiation; and disposing the insulating sleeve between the energy source and an interior wall of an instrument housing therewithin.

14. The method of claim 13 wherein the layers are formed by winding the dielectric material.

15. The method of claim 13 wherein the layers are formed by inserting concentric cylindrical components of the dielectric material onto or into each other.

16. The method of claim 13 wherein a spacing between successive layers is at most 0.002 inches.

17. The method of claim 13 wherein the thickness of each layer is at most 0.020 inches.

18. The method of claim 17 wherein the thickness of each layer is about 0.005 inches.

19. The method of claim 13 wherein the insulating sleeve further comprises a mandrel disposed in an interior of the plurality of layers, the mandrel made from a dielectric material.

* * * * *